United States Patent [19]

Sagara et al.

[11] Patent Number: 5,541,736
[45] Date of Patent: Jul. 30, 1996

[54] COLOR IMAGE FORMING SYSTEM WHICH CONDUCTS CHARGING EXPOSURE AND DEVELOPMENT WITH RESPECT TO A PHOTOSENSITIVE MEDIUM AT A PLURALITY OF TIMES

[75] Inventors: Toshiaki Sagara; Toru Teshigawara; Yasuki Yamauchi; Haruyuki Namba; Takuto Tanaka; Shigeru Inaba; Koichiro Shinohara; Takahide Inoue; Jun Abe, all of Kanagawa, Japan

[73] Assignee: Fuji Xerox Co., Ltd., Tokyo, Japan

[21] Appl. No.: 225,070

[22] Filed: Apr. 8, 1994

[30] Foreign Application Priority Data

Apr. 9, 1993 [JP] Japan ................................ 5-083629

[51] Int. Cl.⁶ .................................................. G03G 15/01
[52] U.S. Cl. ........................ 358/298; 358/536; 347/119
[58] Field of Search ............................. 355/326 R, 239, 355/327; 347/115, 119; 358/298, 533, 534, 536

[56] References Cited

U.S. PATENT DOCUMENTS

| | | | |
|---|---|---|---|
| 4,149,183 | 4/1979 | Pellar et al. | 358/534 |
| 4,959,669 | 9/1990 | Haneda et al. | 347/115 |
| 4,980,757 | 12/1990 | Nishigaki | 358/533 |

FOREIGN PATENT DOCUMENTS

| | | | |
|---|---|---|---|
| 58-4158 | 1/1983 | Japan | 347/115 |
| 63-66579 | 3/1988 | Japan | |
| 63-65460 | 3/1988 | Japan | |
| 63-65459 | 3/1988 | Japan | |
| 63-144367 | 6/1988 | Japan | |
| 1-184136 | 7/1989 | Japan | 347/115 |
| 3-214864 | 9/1991 | Japan | |
| 3-290676 | 12/1991 | Japan | |
| 4-148952 | 5/1992 | Japan | 347/115 |

*Primary Examiner*—Joan H. Pendegrass
*Attorney, Agent, or Firm*—Finnegan, Henderson, Farabow, Garrett & Dunner, L.L.P.

[57] ABSTRACT

A color-image forming apparatus includes: an electrostatic latent image holder; electrostatic latent image forming unit for forming a plurality of electrostatic latent images on the image holder; a scanning unit for scanning the electrostatic latent image holder periodically at predetermined timings; developing devices for developing each of the plurality of electrostatic latent images by toners of each of different colors respectively, and forming thus developed toner image on the image holder; a simultaneously transferring device for simultaneously transferring the plurality of toner images onto a transfer medium; fixing device for fixing the toner image on the transfer medium; and timing-setting unit for setting a timing at which said scanning means starts scanning at each of slow scanning pitches in the direction of fast scanning for each of the plurality of colors; wherein the timings which are allotted to each of the colors are different each other so that the starting position of the scanning of each color at each of slow scanning pitches in the direction of the fast scanning is successively shifted at a predetermined distance.

5 Claims, 9 Drawing Sheets

● : WHEN VERTICAL SCREEN IS USED
◉ : WHEN ROTATION SCREEN IS USED

PARTICLES OF TONER

PARTICLES OF TONER

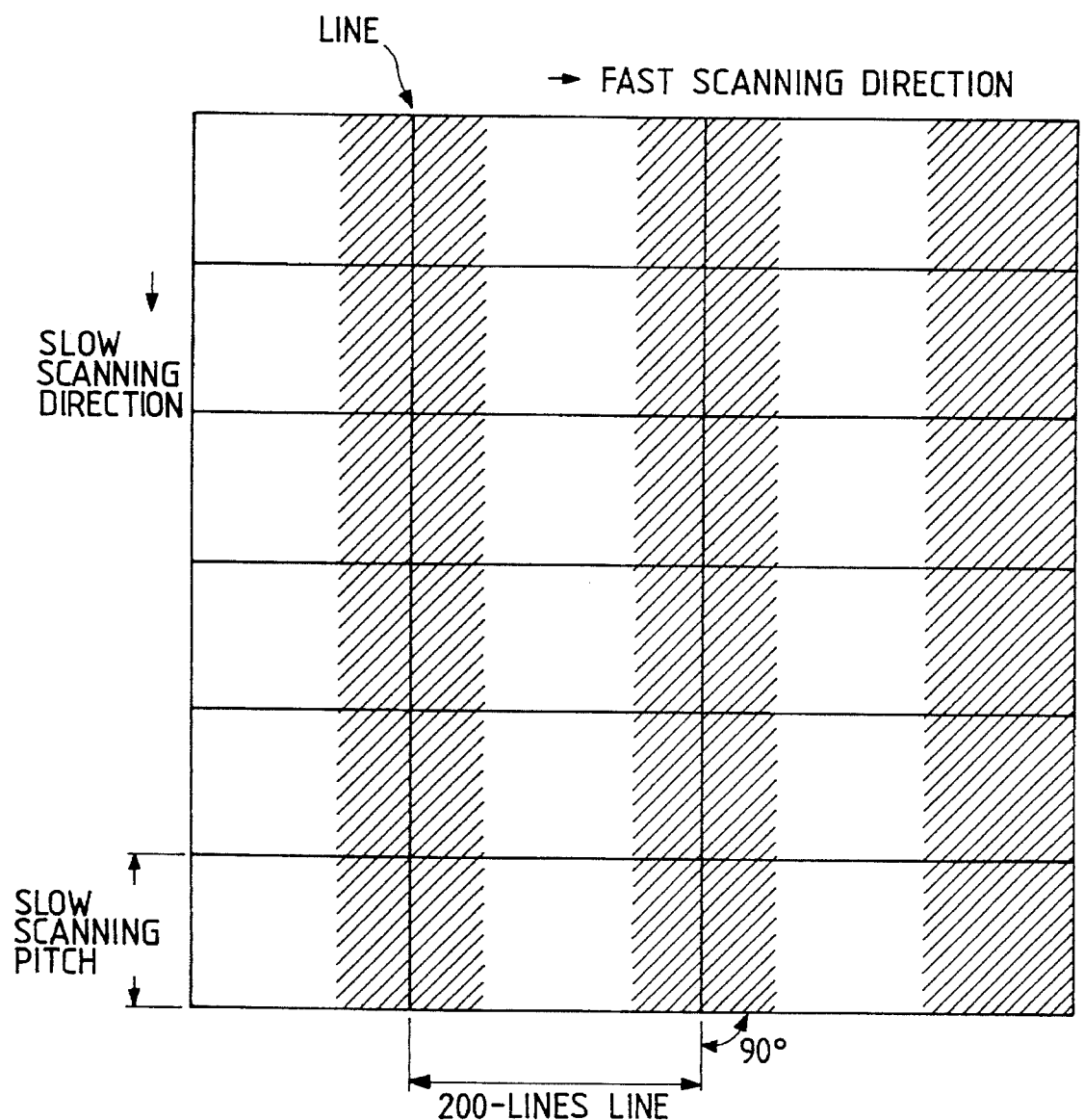

COLOR IMAGE FORMING SYSTEM WHICH CONDUCTS CHARGING EXPOSURE AND DEVELOPMENT WITH RESPECT TO A PHOTOSENSITIVE MEDIUM AT A PLURALITY OF TIMES

BACKGROUND OF THE INVENTION

1. Field of the Invention

The present invention relates to a color image forming apparatus of a digital electrophotographic system which includes a laser scanner, and conducts charging exposure and development with respect to a photosensitive medium at a plurality of times so as to form an image by toners of a plurality of colors.

2. Description of the Related Art

Color copying machines of a digital electrophotographic system are known as a recording system which is capable of high-speed printing with high print quality. In this recording system, charging, exposure, and development are carried out with respect to a photosensitive material, and an image is formed on the photosensitive material by toners of a plurality of colors through color-superimposition development and is transferred onto recording paper so as to form a color image.

In printers and copying machines of this type, an area modulation method using a line screen structure, which is generally known in printing technology, is employed as an image structure for reproducing halftone images.

Since algorithms are relatively simple and the cost is low, this method is adopted in many printers and copying machines of the digital electrophotographic system, and a so-called "equiangular line screen" is used in which all the colors of yellow, magenta, cyan, and black are arranged at identical screen angles.

In these full-color image forming apparatuses, writing is generally performed on the basis of a raster scanning method using a laser beam. In this writing, image information written in each scanning is arranged continuously in a slow(sub) scanning direction so as to realize the line screen structure. Accordingly, its screen angle is 90° in a coordinate system in which the fast scanning direction is set to 0°. That is, so-called 90° equiangular line screen, as shown in FIG. 12, is adopted most widely. In addition, in this "90° equiangular line screen, the halftone is reproduced by an image structure in which the thickness of the line with toners superimposed thereon is varied.

Meanwhile, in an image forming apparatus for forming an image on a photosensitive medium by toners of a plurality of colors, when an image of a second or subsequent color is formed, it is necessary to form a latent image by exposing from above the toner image which is previously formed on the photosensitive medium. At this time, since the image formings of second and subsequent colors are affected by the toner image which is previously formed on the photosensitive medium, and an unevenness in potential occurs, which causes the occurrence of unevenness of color. Namely, it becomes difficult for the toner of the second or subsequent color to be developed on the photosensitive medium, so that there occurs deterioration of the image when the image of the second or subsequent color is formed.

As measures against this problem, methods have been adopted wherein exposure conditions at the time of formation of the image of the second or subsequent color are changed with respect to previous exposure conditions.

For instance, Japanese Patent Unexamined Publication No. Sho. 63-65460 discloses a method in which the exposure intensity is strengthened consecutively toward a later step with respect to each step corresponding to each color. Japanese Patent Unexamined Publication No. Sho. 63-66579 discloses a method in which the exposure time per pixel is made consecutively longer toward a later step with respect to each step corresponding to each color. Japanese Patent Unexamined Publication No. Sho. 63-65459 discloses a method in which the beam diameter is made consecutively larger toward a later step with respect to each step corresponding to each color. Japanese Patent Unexamined Publication No. Sho. 63-290676 discloses a method in which the luminous intensity at the time of exposing a second color is controlled on the basis of information on a first gradation and information on a second gradation.

However, in the conventional 90° equiangular line screen, since the screen angles of all the colors are the same, there occurs the deterioration of the image during the formation of images of second and subsequent colors, as described above. Even if the aforementioned method of changing the exposure intensity or time is adopted, in the case of an image pattern in which the state of image formation differs, there arises the fear of an overexposure or an underexposure. In addition, the cost becomes high in introducing hardware for changing the exposure intensity or time.

In addition, in the method in which the luminous intensity at the time of exposing a second color is controlled on the basis of information on first-gradation information and second-gradation information, a page memory is required for storing the first-gradation information, so that the apparatus becomes high.

As a method which is free from problems attributable to the above-described superimposition of toners, Japanese Patent Unexamined Publication No. Sho. 63-144367 discloses a method of forming an image wherein image formation is effected without directly superposing toners of different colors on top of another. However, the image-forming method described in this publication is not intended for image formation using a screen, and the publication describes no specific means for precisely performing positioning for image exposure with the accuracy of not more than one pixel.

In addition, Japanese Patent Unexamined Publication No. Hei. 3-214864 discloses a technique wherein the amount of a reference signal being delayed is changed for each line so as to remove moiré. However, the technique described in this publication prevents the occurrence of moiré due to the mutual interference of toner images of the respective colors as spacial frequency after the toner images are transferred onto paper, and does not address the problem of the superposition of toner images on the photosensitive medium.

SUMMARY OF THE INVENTION

It is an object of the present invention to reliably develop second and subsequent toner images to obtain an excellent halftone image in a color-image forming apparatus in which a plurality of charging, exposure and development are carried out so as to form images on a photosensitive medium by toners of a plurality of colors.

A color-image forming apparatus of the present invention includes: an electrostatic latent image holder for holding an electrostatic latent image; electrostatic latent image forming unit for forming a plurality of electrostatic latent images on the electrostatic latent image holder; scanning unit provided with the electrostatic latent image forming unit for scanning the electrostatic latent image holding unit periodically at predetermined timings a plurality of times; a plurality of developing device for developing each of the plurality of electrostatic latent images by toners of each of different colors respectively, and forming thus developed toner image on the electrostatic latent image holder; simultaneously transferring charger for transferring simultaneously the plurality of developed and formed toner images onto a transfer medium; fixing device for fixing the toner image on the transfer medium for carrying the toner images; and timing-setting unit for setting a timing at which the scanning unit starts scanning in each of slow scanning pitches in the direction of fast scanning for each of the plurality of colors.

In the present invention, since the direction of the latent images of toners formed on the photosensitive medium differ for the respective colors, the toners on the photosensitive medium do not interfere with each other, and the effect due to the previously developed toner is reduced. As a result, the electric potential and the development efficiency become stable so that the quality of the reproduced image, particularly color reproducibility and gradient reproducibility are improved to be able to obtain stable full-color images.

BRIEF DESCRIPTION OF THE DRAWINGS

In the drawings:

FIG. 12 is a diagram illustrating a conventional 90° 200-line screen.

DESCRIPTION OF THE PREFERRED EMBODIMENTS

Figure 1:
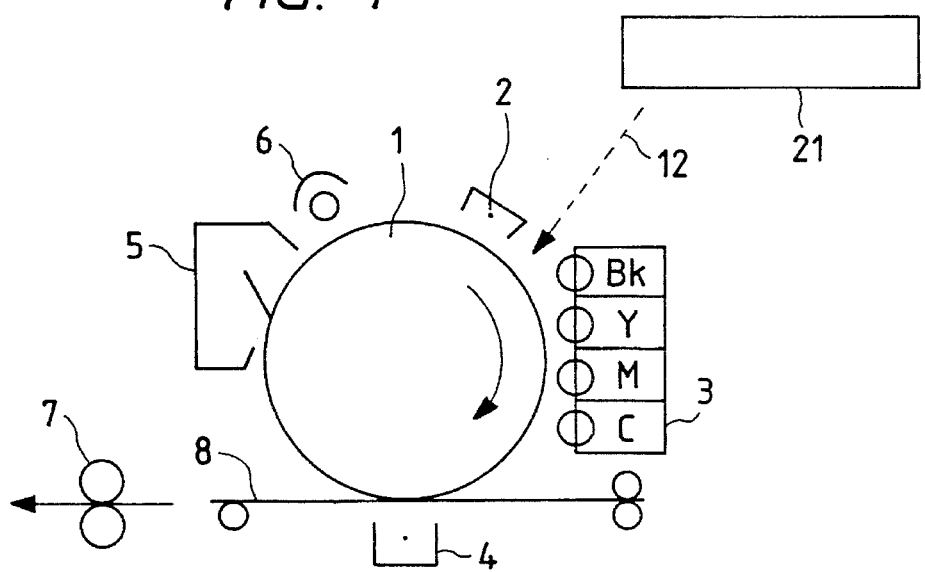
FIG. 1 is a schematic diagram of a color-image forming apparatus to which the present invention is applied.

Referring now to the accompanying drawings, the preferred embodiment of the present invention will be described in detail as follows. FIG. 1 is a schematic diagram of a color-image forming apparatus in accordance with an embodiment of the present invention.

In FIG. 1, the following are arranged around a drum-shaped photosensitive material 1: a latent-image forming charger 2, a developing device 3 in which developers of various colors including yellow, magenta, cyan, and black are accommodated, a simultaneous transfer charger 4, a cleaner 5, and an erase lamp 6. Furthermore, a fixing device 7 is disposed at a downstream position as viewed in the direction of moving of a recording material 8.

The photosensitive material 1 rotates in the direction of the arrow, and its surface is electrically charged uniformly by the latent-image forming charger 2. Then, the surface is irradiated with a laser beam modulated in accordance with information on an image of a first color to effect an exposure for the first color so as to form an electrostatic latent image of the first color on the photosensitive material 1. Subsequently, the developing device 3 develops the electrostatic latent image of the first color on the photosensitive material 1 by using the toner of the first color to be visible, thereby forming a toner image of the first color.

Then, the operation proceeds to a process of forming a latent image of the second color. As for the second color, the surface of the photosensitive material 1 is electrically charged from above the already-developed toner of the first color, and is irradiated with a laser beam to effect an exposure for the second color. As a result, an electrostatic latent image of the second color is formed on the photosensitive material 1, and thus formed image is developed to be visible by the developing device 3 with using the toner of a color different from the first color. Then, the similar processes are repeated for the third and fourth colors, thereafter, the image is transferred onto the recording material 8 which is outputted as a full color image through the fixing device 7.

Next, a description will be given of the image formation by a line screen.

Figure 2:
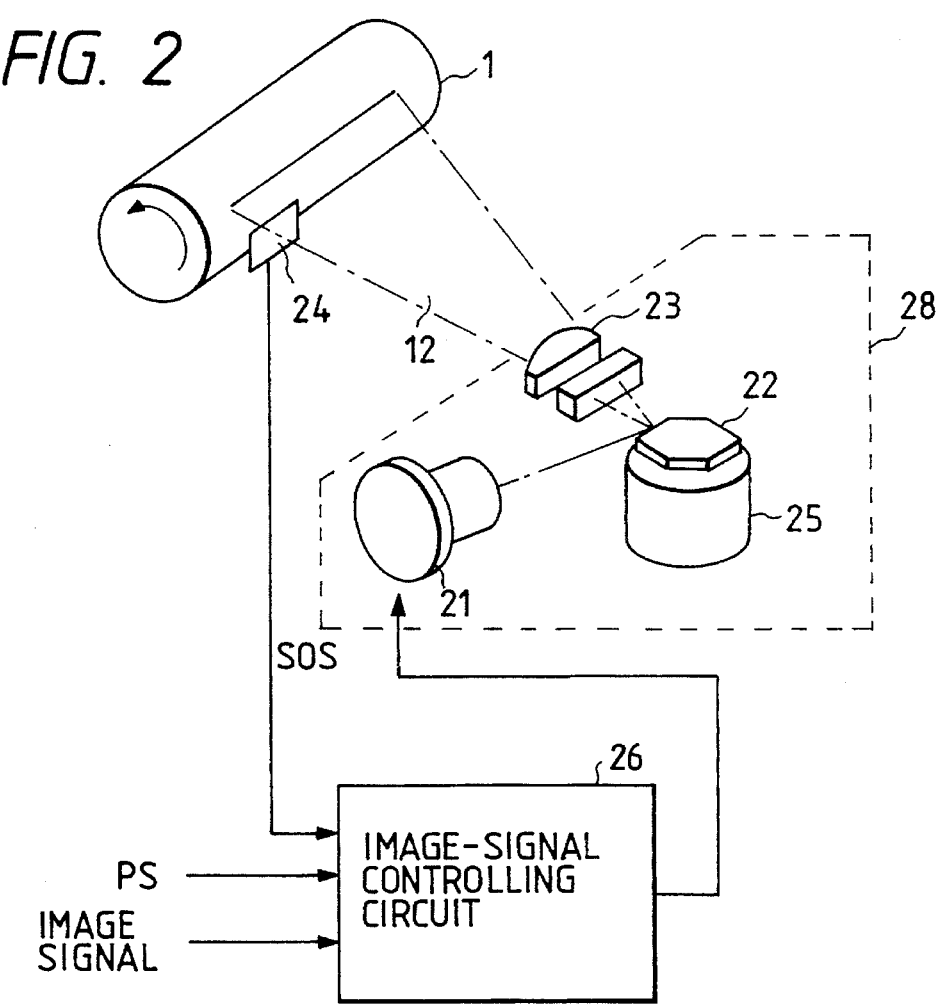
FIG. 2 is a diagram schematically illustrating an electrostatic-latent-image forming mechanism of the color-image forming apparatus shown in FIG. 1.

FIG. 2 is a diagram schematically illustrating a configuration of a portion of the color-image forming apparatus shown in FIG. 1 for forming an electrostatic latent image on the photosensitive material 1. In FIG. 2, a scanning unit 28 includes a laser light source 21, a polygonal mirror 22, an f-θ lens 23, and a polygonal-mirror driving motor 25. The laser beam from the laser light source 21 is made to scan the photosensitive material 1 through the polygonal mirror 22, i.e., a deflector, and the f-θ lens 23. A photosensor 24 serving as a scanning-start detecting unit is disposed at one end of the photosensitive material 1, which generates a reference signal for the start of scanning, i.e., a start-of-scan signal SOS, by a laser beam 12 being made incident on each facet of the polygonal mirror 22. The polygonal mirror 22 is driven by the polygonal-mirror driving motor 25. The start-of-scan signal SOS is inputted to an image-signal control circuit 26 together with a page synchronization signal PS, image signals and other signals so that the image signal modulates the laser light source 21 in synchronism with the scanning of the laser beam 12.

Figure 3:
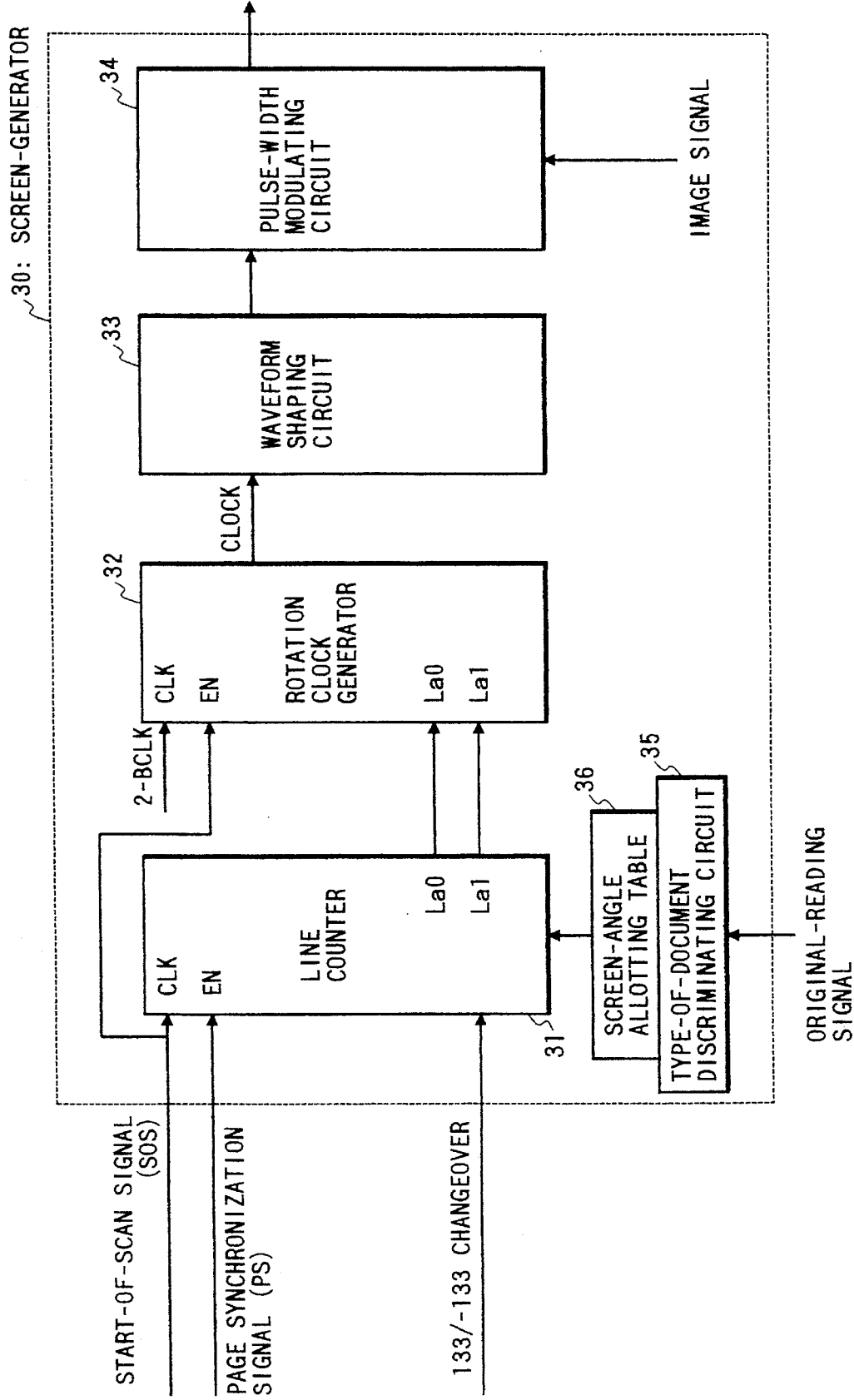
FIG. 3 is a block diagram of an image controlling circuit shown in FIG. 2.

The aforementioned image-signal controlling circuit 26 is provided with a screen generator 30, a waveform-shaping circuit 33, a pulse-width modulating circuit 34 and the like as shown in FIG. 3.

Figure 4:
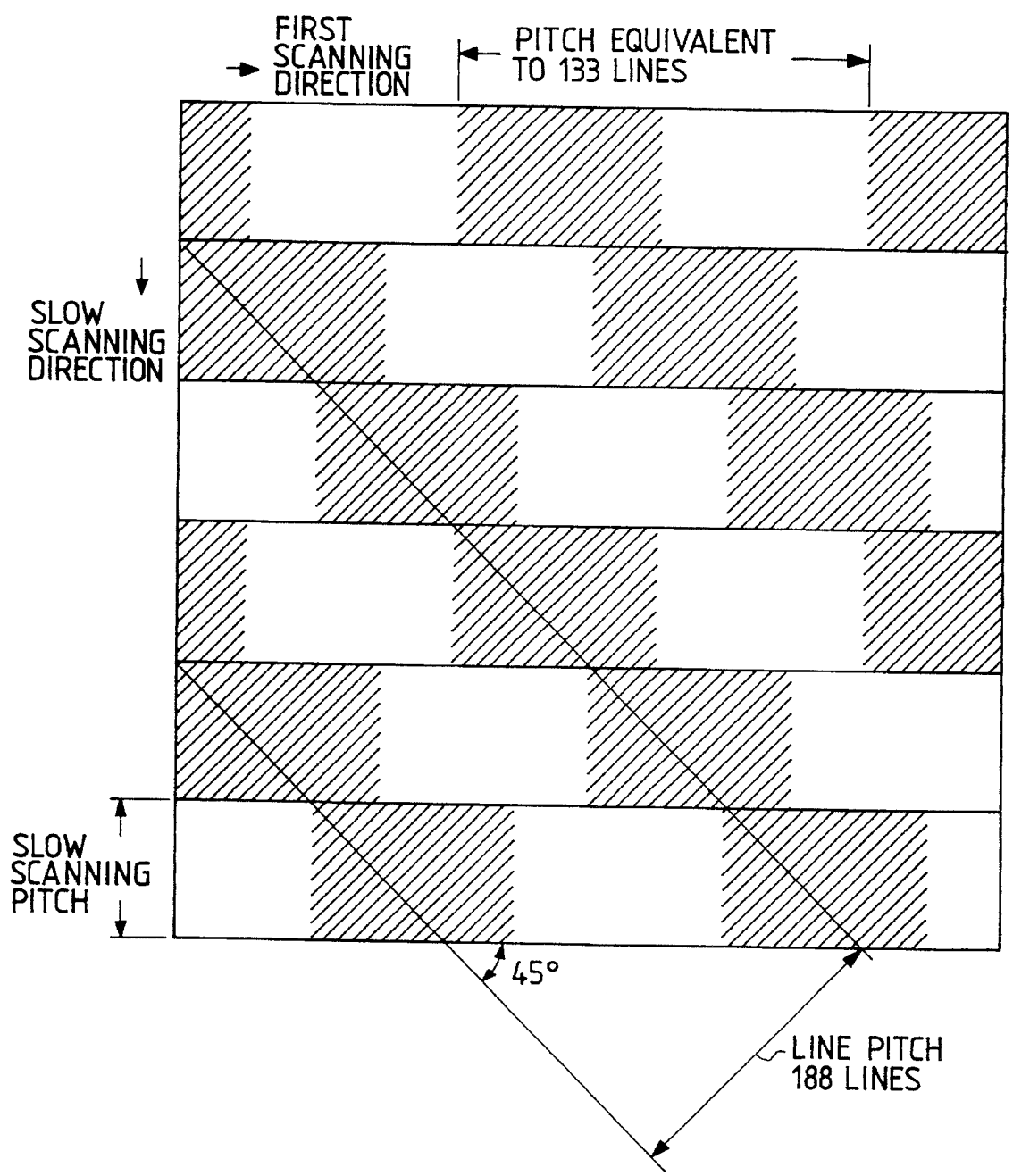
FIG. 4 is a diagram illustrating a 45° 189-line screen.

The screen generator 30 generates a single-line clock necessary for effecting the image formation by the line screen. Here, an example is shown in which single lines of a 133-line pitch are rotated by 45°, to form single lines of a 189-line pitch at 45° as shown in FIG. 4.

The screen generator 30 has a line counter 31 and a 133-line rotation clock generator 32. The start-of-scan signal SOS which is generated for each fast(main) scan is supplied to the clock terminal of the line counter 31, while the page synchronization signal PS indicating a leading end of the page of an output image is supplied to its enable terminal. In addition, a screen-angle changeover signal for changing over the screen angle is also supplied to the line counter 31.

The line counter 31 has a more number of bits than sufficient to count a plurality of lines composing one image to allow the bits to be used for other purposes as well, and signals La0 and La1 at the two least significant bits of its output are used for rotating the screen angle.

Figure 5:
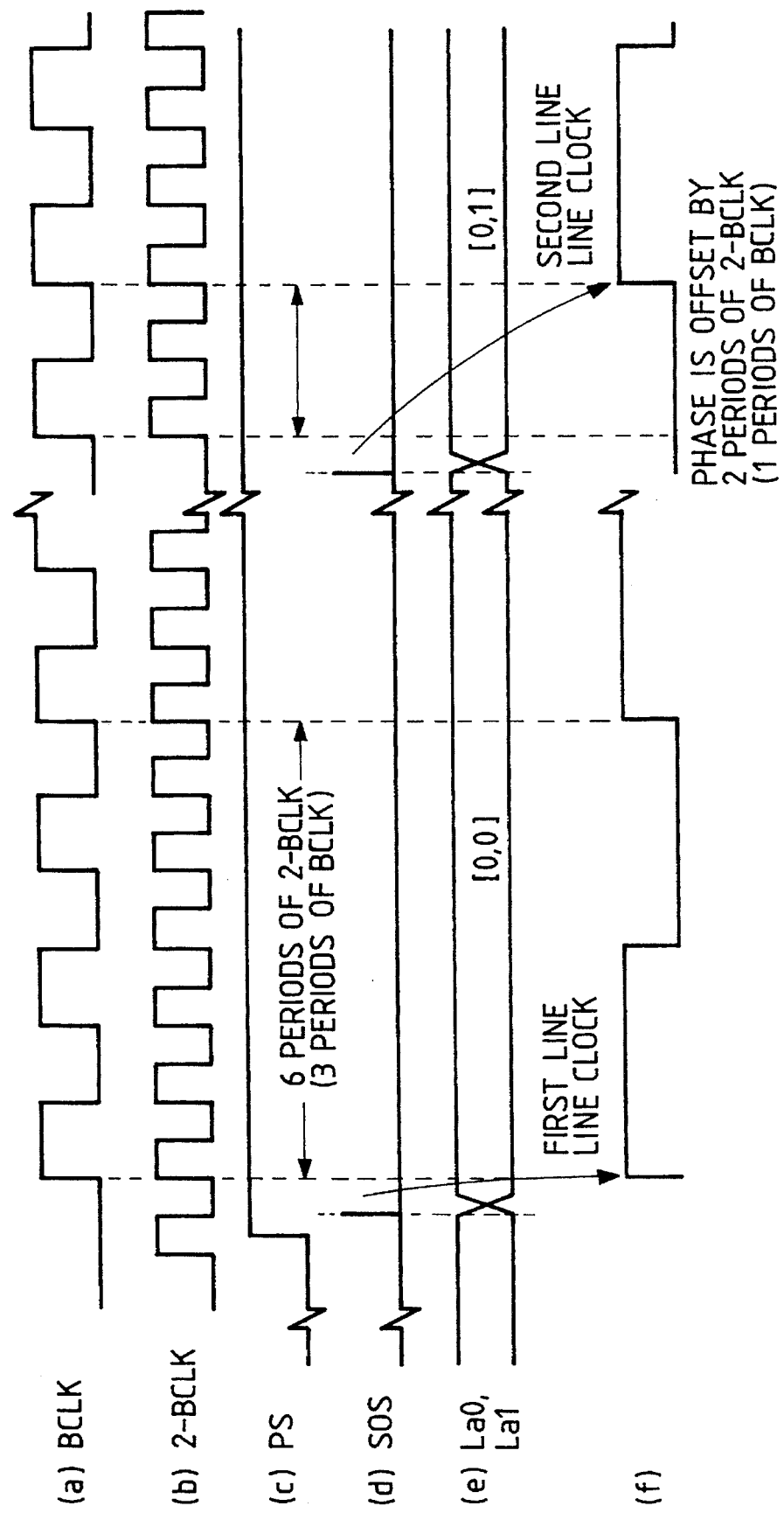
FIG. 5 is a timing chart explaining the generation of a rotated-single-line clock in a screen generator shown in FIG. 3.

As shown in FIG. 5, after the page synchronization signal PS (the part (c) of FIG. 5) has become effective, this line counter 31 counts the start-of-scan signal SOS (the part (d) of FIG. 5) to generate an output (the part (e) of FIG. 5) in which two-bit signals of La0 and La1 are repeated in a cycle of three lines as [0, 0], [0, 1], [1, 0], [0, 0], [0, 1], . . . These two-bit signals La0 and La1 are supplied to the rotation clock generator 32 for 133 lines. Namely, signals representing "0," "1," "2," "0," "1," . . . in decimal notation are supplied to the rotation clock generator 32. In addition, a clock (2-BCLK) of a frequency which is two times the frequency of a pixel clock BCLK and the start-of-scan signal SOS are also supplied to the rotation clock generator 32 (the parts (a) and (b) of FIG. 5).

In the rotation clock generator 32, when the start-of-scan signal SOS is inputted, an amount of offset of 0 if the two bits of La0 and La1 are [0, 0], an amount of offset of 2 if they are [0, 1], and an amount of offset of 4 if they are [1, 0] are set in a counter circuit (not shown) incorporated in the rotation clock generator 32, and the clock (2-BCLK) of a frequency which is two times the frequency of the pixel clock BCLK is divided by 6. These amounts of offset are stored in advance in a memory incorporated in the rotation clock generator 32. As a result of this processing, a rotated-single-line clock is obtained in which each clock of the pixel clock BCLK is shifted for each line and the frequency is divided into three periods (the part (f) of FIG. 5).

Figure 6:
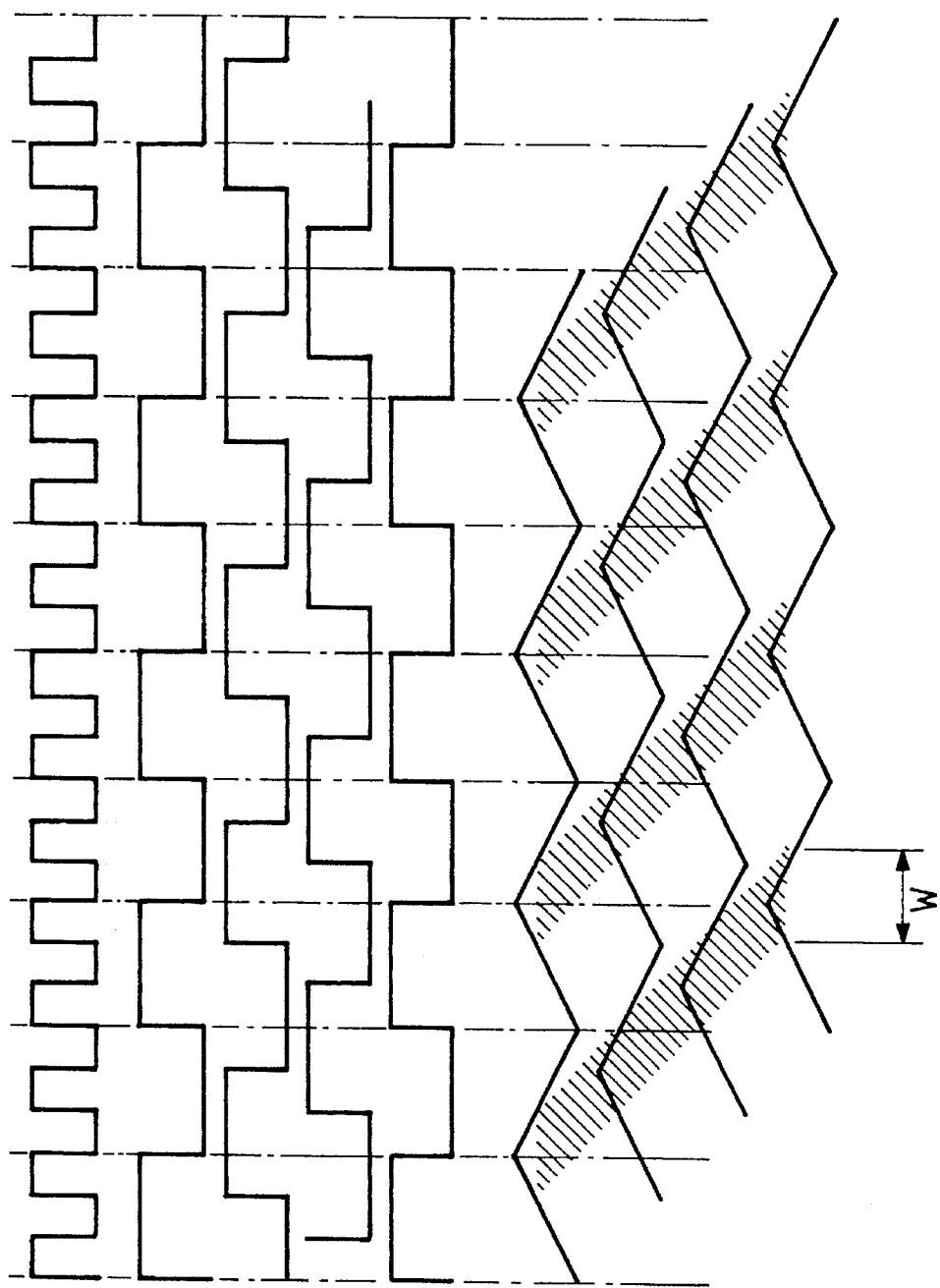
FIG. 6 is a timing chart illustrating the relationship between rotated-single-line clocks and an image structure.

FIG. 6 shows a consecutive four-line portion of the single-line clocks thus obtained. In the drawing, BCLK denotes the pixel clock BCLK, i.e., a synchronization signal for each basic pixel at 400 spi (spots per inch) (the part (a) of FIG. 6). As the line advances from the start of the page in the manner of the first line, the second line, the third line, the fourth line, . . . , first to fourth single-line clocks in which the phase is delayed each by one clock of the pixel clock BCLK are generated (the parts (b) to (e) of FIG. 6). By these single-line clocks, triangular pulses (the parts (f) to (i) of FIG. 6) supplied to the waveform-shaping circuit 33 shown in FIG. 3 and synchronized with the single-line clocks are generated. Analog image signals and the triangular waves generated on the basis of the single-line clocks are supplied to the pulse-width modulating circuit 34 comprised of a comparator circuit. In the pulse-width modulating circuit 34, the triangular waves and the image signals are compared, and line images of 189 lines inclined downward to the right at 45° (i.e., + 45°) are obtained, as shown in FIG. 4. However, these 189 lines represent a pitch as seen in the fast scanning direction. The line images are schematically shown by hatching in the parts (f) to (i) of FIG. 6. The line width W of the line image depends on the density of the image, and the higher the density makes the greater the width W.

In a word, the scanning unit 28 as shown in FIG. 2 scans the photosensitive material 1 in accordance with the triangular waves and the image signals. Namely, image-signal controlling circuit 26 sets timings at which the scanning unit 28 starts scanning at each of slow scanning pitches in the direction of the fast scanning for each of the colors. The timings which are allotted to each of the colors are different each other. Accordingly, the starting position of the scanning of each color at each of slow scanning pitches in the direction of the fast scanning is successively shifted at a predetermined distance.

It is noted that, in order to reverse the screen angle, i.e., to set it at −45°, it suffices if signals "0," "2," "1," "0," "2," . . . are generated in decimal notation by the line counter 31, and are supplied to the rotation clock generator 32. The changeover of this screen angle is effected by a screen-angle changeover signal supplied to the line counter 31.

In the above-described example, only two kinds of +45° and −45° are described as the screen angle, but the screen angle may be changed in accordance with the amount of offset set in the counter circuit incorporated in the rotation clock generator 32. Namely, if the amount of offset is reduced, the screen angle approaches 90°, and if the amount of offset is conversely increased, the screen angle approaches 0°. Consequently, it is possible to allot mutually different screen angles with respect to the respective colors.

It is noted that, in allotting the screen angles, the respective colors may be set at fixed angles, but the screen angles may be changed in accordance with the type of original to be outputted. This is attributable to the fact that, for example, if an image is formed by using a line screen on the basis of an image signal obtained by reading a dot image, the screen of the dot image of the original interferes with a screen for outputting an image so as to may produce moiré when the dot image has a particular number of lines.

Accordingly, to overcome such a drawback, in an embodiment shown in FIG. 3, there are provided a type-of-original discriminating circuit 35 for outputting a discrimination signal by discriminating the type of original to be outputted, and a screen-angle allotting table 36 in which the screen angles are allotted in advance on the basis of the discrimination signals from the type-of-original discriminating circuit 35.

For instance, in a digital electrophotographic copying machine, since an image inputting device for reading an image on the original and converting it into image signals is provided, particular frequency components corresponding to the number of lines are included in the image signals when an original including a dot image is read. The type-of-original discriminating circuit 35 discriminates a frequency component included in the image signal, and outputs a discrimination signal corresponding to the discriminated frequency. Screen angles corresponding to the number of lines are stored in advance in the screen-angle allotting table 36, and a screen angle which does not produce moiré is selected in response to the discrimination signal from the type-of-original discriminating circuit 35. Consequently, an optimum screen angle is automatically selected in accordance with the type of original. In addition, an appropriate screen angle may be selected manually from the screen-angle allotting table 36, as required.

Hereafter, a description will be given of the advantages in the case where an image is formed by varying the screen angles for the respective colors in the above-described manner.

Figure 7:
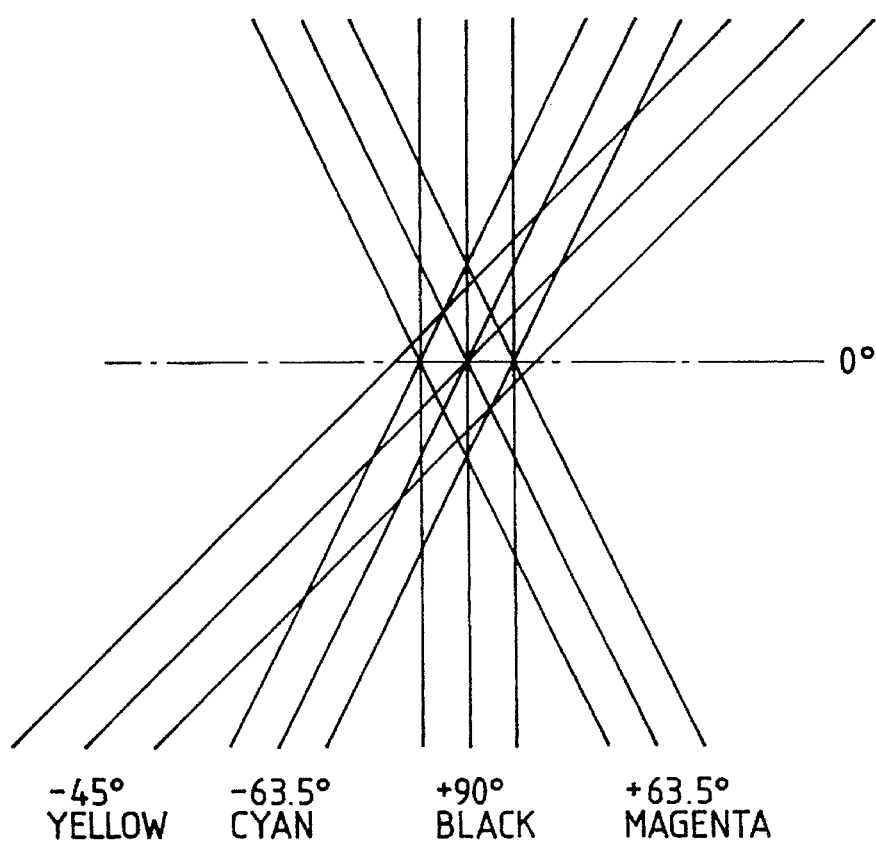
FIG. 7 is a diagram illustrating differences in the screen angle for each color.
Figure 8:
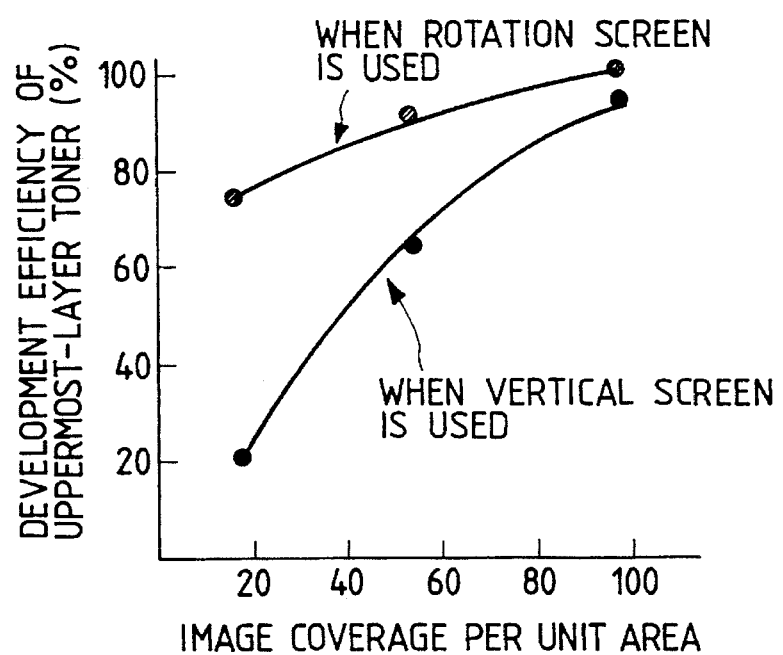
FIG. 8 is a graph illustrating the development efficiency of an uppermost-layer toner with respect to the image coverage per unit area.
Figure 9:
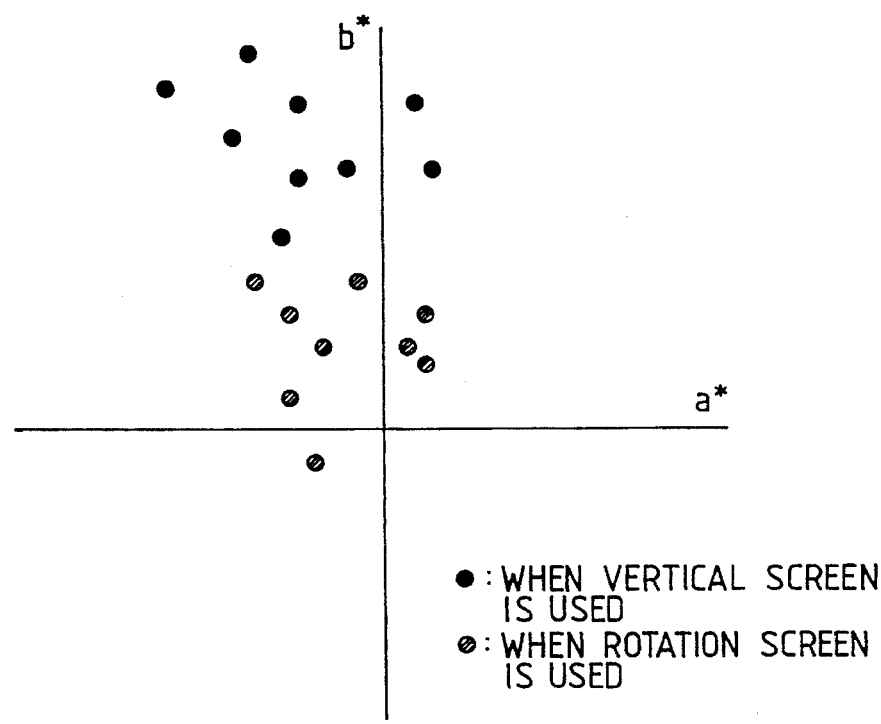
FIG. 9 is a graph illustrating differences in color reproducibility in an a*-b* space.

In the color-image forming apparatus shown in FIG. 1, images of process black, i.e., images with three colors, yellow, magenta, and cyan, superposed were outputted in two cases, i.e., a case where the screen angles of all the colors were set at 90° and a case where black was set at 90°, yellow at −45°, cyan at −63.5°, and magenta at 63.5°, as shown in FIG. 7. The results are shown in FIGS. 8 and 9. FIG. 8 shows the development efficiency of an uppermost toner layer with respect to the image coverage per unit area, while FIG. 9 shows color reproducibility in the coverage of several stages in an a*–b* coordinate space.

It is noted that, to change the screen angle, it suffices to change the amount of offset, as described before. For example, if a 90° screen of 200 lines is offset by a ¼ pitch, the screen becomes a 63.5° screen. This amount of offset is determined in advance in accordance with each angle, and is further determined in accordance with an image input signal.

Figure 10A:
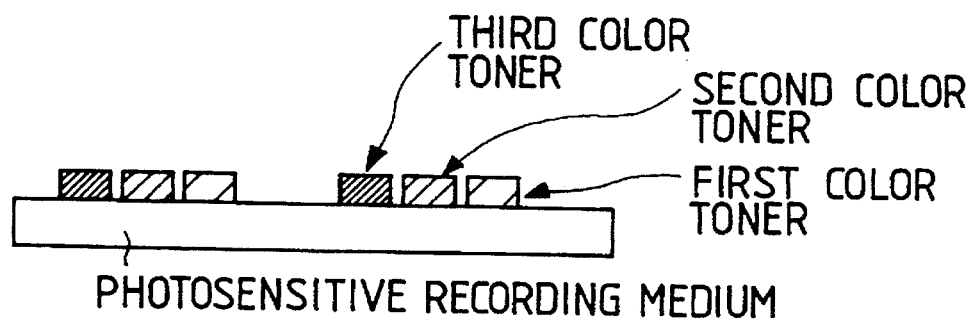
FIG. 10(A) is a diagram illustrating a state of superposition of toners at medium- and low-density portion on a photosensitive recording medium in accordance with an embodiment.
Figure 10B:
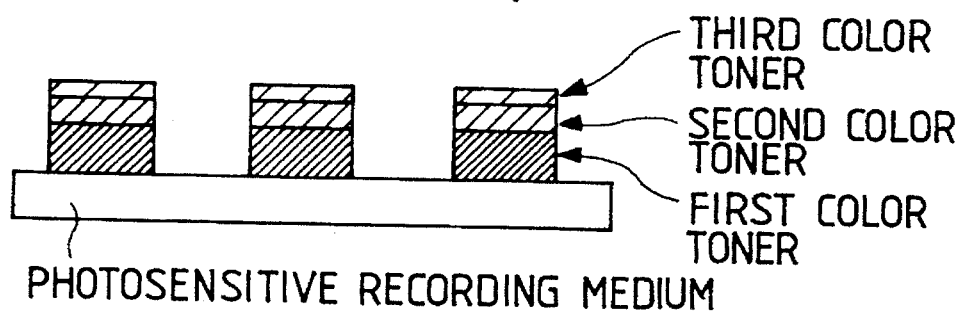
FIG. 10(B) is a diagram illustrating a state of superposition of toners at medium-density portion on a photosensitive recording medium in accordance with a conventional example.
Figure 10C:
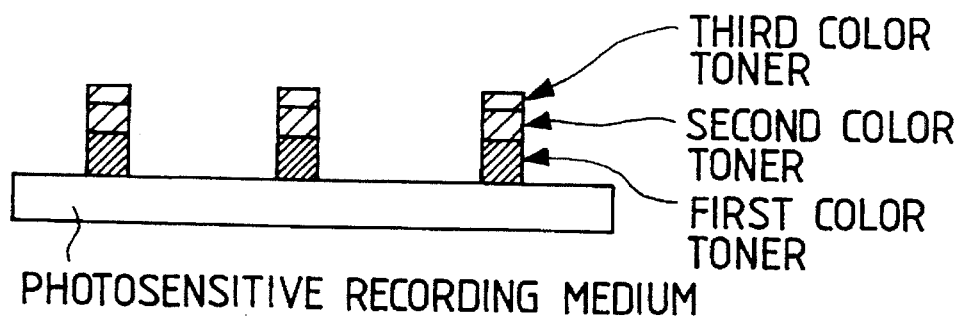
FIG. 10(C) is a diagram illustrating a state of superposition of toners at low-density portion on a photosensitive recording medium in accordance with a conventional example.

As can be appreciated from FIGS. 8 and 9, in accordance with this embodiment, by using the rotated single lines, an image structure with respect to medium- and low-density portion such as the one shown in FIG. 10(A) is obtained. Comparing with FIG. 10(B) and 10(C) which show the conventional superposition of the toners at the medium- and low-density portion of three colors, the state of development of an upper-layer toner of the present invention is less affected by the presence or absence of a lower-layer toner, so that the development efficiency of the toner in the upper layer is improved, and a necessary amount of toner is developed. Hence, the balance in the supply of each toner is maintained, and the color reproducibility (particularly the gray balance) improves. Furthermore, the pile height becomes uniform so that stable transfer is performed to be able to obtain an excellent color image.

Figure 11A:
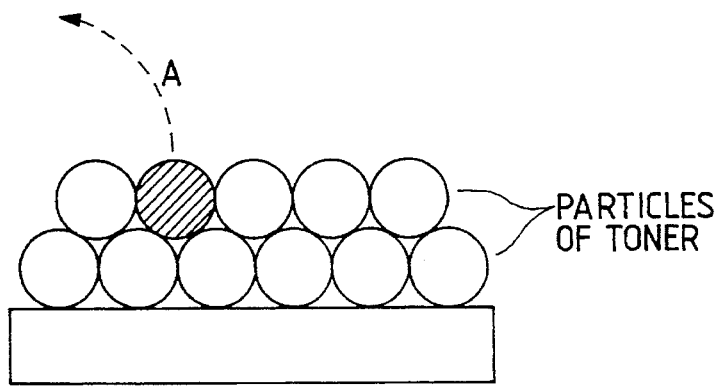
FIGS. 11(A) and 11(B) are diagrams illustrating particle diameters of toners and surface conditions after lamination.
Figure 11B:
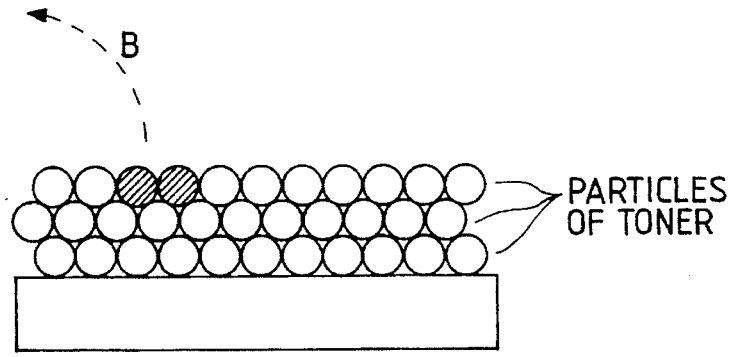

In addition, although, in the above-described embodiment, the output patterns of black, yellow, magenta, and cyan are set at 90° for black, −45° for yellow, −63.5° for cyan, and 63.5° for magenta, the present invention is not limited to the same, and various modifications are possible insofar as they do not depart from the scope of the present invention. For example, black may be set at 90°, yellow at −63.5°, magenta at 45°, and cyan −45°. In addition to the above-described arrangement in which the screen angles are varied for the respective colors, if the latent image on the photosensitive medium is developed by toners having particle diameters of 7 μm or less, in particular, as shown in FIG. 11(B), instead of the generally used toners having particle diameters of 10–12 μm or less as shown in FIG. 11(A), the coarseness of the toner surface is ameliorated so as to make be possible to obtain images with excellent quality of particles. For instance, if development is effected by using a toner having a large particle size as shown in FIG. 11(A), in the event that a toner particle with a certain area is peeled off as indicated by the broken line A, the depth of the missing portion becomes large. On the other hand, if development is effected by using a toner having a small particle size as shown in FIG. 11(B), in the event that toner particles with the same area are peeled off as indicated by the broken line B, the depth of the missing portion becomes small. Hence, it is possible to obtain an image with satisfactory quality of particle. According to an experiment, if the particle diameter of the toner exceeds 7 μm, the visual evaluation of quality of particles declined as shown in Table 1 below.

TABLE 1

| Toner particle diameter | Visual evaluation of particles |
| --- | --- |
| 12 (μm) | X |
| 10 (μm) | X |
| 7 (μm) | O |
| 5 (μm) | O |

In Table 1, the mark X represents "poor," while the mark O represents "good."

As described above, in accordance with the present invention, as the screen angles of a plurality of toner images formed on a photosensitive recording medium are varied for the respective colors, toners for forming a multicolor image on the photosensitive recording medium can be supplied stably in appropriate amounts irrespectively for an upper layer portion and a lower layer portion without changing the exposure intensity or time. Hence, it is constantly possible to obtain full-color images excelling in color reproducibility, gradient reproducibility, and quality of particles.

What is claimed is:

1. A color-image forming apparatus for forming an image on a photosensitive medium by toners of a plurality of colors by carrying out charging, exposure, and development with respect to the photosensitive medium at a plurality of times, said apparatus comprising:

means for inputting a signal representative of a color image including a plurality of colors;

pulse-generating means for generating periodic pulses serving as a reference for a line screen;

pulse-width modulating means for generating a pulse of a width corresponding to a level of the inputted color-image signal in synchronism with a periodic pulse from said pulse-generating means to form a singled-lined screen in which line screens, composed of lines of each of said colors, are arranged periodically in a fast scanning direction; and means for shifting a timing of writing the lines by a fixed amount different for each of the colors in each scan to vary an angle of the lines for each of the colors.

2. A color-image forming apparatus comprising:

electrostatic latent image holding means for holding an electrostatic latent image;

electrostatic latent image forming means for forming a plurality of electrostatic latent images on said electrostatic latent image holding means;

scanning means provided with said electrostatic latent image forming means for scanning said electrostatic latent image holding means periodically at predetermined timings a plurality of times;

a plurality of developing means for developing each of said plurality of electrostatic latent images by toners of each of different colors respectively, and forming thus developed toner image on said electrostatic latent image holding means;

simultaneous transferring means for simultaneously transferring the plurality of developed and formed toner images onto a transfer medium;

fixing means for fixing the toner image on said transfer medium for carrying the toner images; and timing-setting means for setting a timing at which said scanning means starts scanning at each of slow scanning pitches in the direction of fast scanning for each of the plurality of colors;

wherein the timings being allotted to each of the colors are different each other, and the starting position of the scanning means of each color at each of slow scanning pitches in the direction of the fast scanning is successively shifted at a predetermined distance.

3. A color-image forming apparatus according to claim 2, wherein the particle diameter of said toner is less than 7 μm.

4. A color-image forming apparatus comprising:

electrostatic latent image holding means for holding an electrostatic latent image;

electrostatic latent image forming means for forming a plurality of electrostatic latent images on said electrostatic latent image holding means;

a plurality of developing means for developing each of said plurality of electrostatic latent images by toners of each of different colors respectively, and forming thus developed toner image on said electrostatic latent image holding means;

simultaneous transferring means for simultaneously transferring the plurality of color toner images onto a transfer medium;

fixing means for fixing the toner image on said transfer medium for carrying the toner images; and wherein said electrostatic latent image forming means includes scanning means for scanning said electrostatic latent image holding means periodically at predetermined timings a plurality of times, shift means for shifting a start timing of the scanning of said scanning means at a predetermined time in each scanning of the plurality of scanning, and setting means for setting said predetermined time in each of the plurality of latent images.

5. A color-image forming apparatus comprising:

electrostatic latent image holding means for holding an electrostatic latent image;

electrostatic latent image forming means for forming a plurality of electrostatic latent images on said electrostatic latent image holding means;

scanning means provided with said electrostatic latent image forming means for scanning said electrostatic latent image holding means periodically at predetermined timings a plurality of times;

a plurality of developing means for developing each of said plurality of electrostatic latent images by toners of each of different colors respectively, and forming thus developed toner image on said electrostatic latent image holding means;

simultaneous transferring means for simultaneously transferring the plurality of developed and formed toner images onto a transfer medium;

fixing means for fixing the toner image on said transfer medium for carrying the toner images;

timing-setting means for setting a timing at which said scanning means starts scanning at each of slow scanning pitches in the direction of fast scanning for each of the plurality of colors, wherein said timing-setting means set said timing based on said screen angle;

image reading means for reading original and converting it to image signals;

type-of-original discriminating means for discriminating the type of read original;

screen angle allotting means for allotting a screen angle in accordance with the type of read original; and wherein the timing being allotted to each of the colors are different from each other, and the starting position of the scanning means of each color at each of the slow scanning pitches in the direction of the fast scanning is successively shifted at a predetermined distance.

* * * * *